United States Patent
Wilhelm et al.

(10) Patent No.: US 9,149,968 B2
(45) Date of Patent: Oct. 6, 2015

(54) METHOD FOR PRODUCING MOLDED PARTS FROM A POLYOXYMETHYLENE POLYMER

(75) Inventors: Wolfgang Wilhelm, Ludwigshafen (DE); Rainer Klenz, Haßloch (DE); Dirk Binkowski, Mannheim (DE)

(73) Assignee: BASF SE, Ludwigshafen (DE)

( * ) Notice: Subject to any disclaimer, the term of this patent is extended or adjusted under 35 U.S.C. 154(b) by 94 days.

(21) Appl. No.: 13/148,338

(22) PCT Filed: Feb. 5, 2010

(86) PCT No.: PCT/EP2010/051419
§ 371 (c)(1),
(2), (4) Date: Aug. 8, 2011

(87) PCT Pub. No.: WO2010/089369
PCT Pub. Date: Aug. 12, 2010

(65) Prior Publication Data
US 2011/0309558 A1   Dec. 22, 2011

(30) Foreign Application Priority Data
Feb. 9, 2009  (EP) .................................. 09152399

(51) Int. Cl.
| | | |
|---|---|---|
| B29C 47/78 | (2006.01) | |
| B29C 49/00 | (2006.01) | |
| B29C 47/00 | (2006.01) | |
| B29C 47/58 | (2006.01) | |
| B29C 47/82 | (2006.01) | |
| B29C 49/04 | (2006.01) | |
| B29K 59/00 | (2006.01) | |

(52) U.S. Cl.
CPC .......... *B29C 49/0005* (2013.01); *B29C 47/0023* (2013.01); *B29C 47/585* (2013.01); *B29C 47/82* (2013.01); *B29C 49/04* (2013.01); *B29K 2059/00* (2013.01)

(58) Field of Classification Search
CPC .............................. B29C 47/585; B29C 47/82
USPC ........................................................ 264/542
See application file for complete search history.

(56) References Cited

U.S. PATENT DOCUMENTS

| 3,954,366 A | 5/1976 | Fields |
| 4,046,738 A | 9/1977 | Sextro et al. |
| 4,100,245 A | 7/1978 | Horikawa et al. |
| 4,500,481 A * | 2/1985 | Marx, III ..................... 264/40.6 |
| 5,234,656 A * | 8/1993 | Kniss ....................... 264/328.18 |
| 5,286,808 A * | 2/1994 | Collins et al. ................. 525/401 |
| 5,909,958 A * | 6/1999 | Rauwendaal ................ 366/76.2 |
| 2003/0128623 A1 | 7/2003 | Leveque |
| 2010/0249311 A1 | 9/2010 | Eipper et al. |

FOREIGN PATENT DOCUMENTS

| EP | 0121407 A2 | 10/1984 |
| EP | 0414060 A1 | 2/1991 |
| EP | 0568308 A2 | 11/1993 |
| JP | 04163022 A | 6/1992 |
| JP | 09327855 A | 12/1997 |
| WO | WO-2005/007384 A1 | 1/2005 |

OTHER PUBLICATIONS

D. Boes et al., 30 *Jahre Nutenextruder* [30 years of grooved extruders], in Kunststoffe 80, 1990, No. 6, pp. 659-664.
International Preliminary Report on Patentability for PCT/EP2010/051419 (Aug. 9, 2011).

* cited by examiner

*Primary Examiner* — Ryan Ochylski
(74) *Attorney, Agent, or Firm* — Drinker Biddle & Reath LLP

(57) ABSTRACT

The invention relates to a process for the production of moldings composed of a polyoxymethylene polymer via blow molding, in which the polyoxymethylene polymer is extruded to give tubing, using an extruder with a grooved feed section, where the feed section is heated to a temperature in the range from 100 to 230° C., and the extruded tubing composed of the polyoxymethylene polymer is introduced into a blow mold, and a molding composed of the extruded tubing is produced in the blow mold.

12 Claims, No Drawings

METHOD FOR PRODUCING MOLDED PARTS FROM A POLYOXYMETHYLENE POLYMER

CROSS-REFERENCE TO RELATED APPLICATIONS

This application is a national stage application (under 35 U.S.C. §371) of PCT/EP2010/051419, filed Feb. 5, 2010, which claims benefit of European application 09152399.3, filed Feb. 9, 2009.

BACKGROUND OF THE INVENTION

The invention relates to a process for the production of moldings composed of a polyoxymethylene polymer via blow molding.

Blow molding processes are used in particular to produce hollow bodies. These can by way of example be storage containers or transport containers, for example for media which are gases, liquids, or solids. Examples of these storage vessels or containers are bottles, tanks, or the like.

Blow-molding processes usually melt a semifinished polymer product, generally pellets, in an extruder, and extrude the material to give tubing. The tubing is then molded in a blow mold to give the hollow body, by introducing a mandrel into the tubing and injecting a pressurized gas into the tubing via the mandrel, the result being that the tubing is pressed against the walls of the blow mold. The temperatures of the blow mold here are below the melting point of the polymer, and the polymer therefore solidifies in the mold.

A blow-molding process for the production of moldings composed of polyoxymethylene/polyurethane mixtures is known by way of example from EP-A 0 121 407. The polyurethane is added in order to improve the properties of the polyoxymethylene.

A process for the production of moldings via blow molding, from polyoxymethylene resins, is known by way of example from EP-A 0 568 308. The molecular structure of the polyoxymethylene copolymer used is in essence linear.

For the melting process, extruders with grooved feed sections have become established. These extruders with grooved feed sections are described by way of example in D. Boes et al., 30 *Jahre Nutenextruder [30 years of grooved extruders]*, in Kunststoffe 80, 1990, No. 6, pages 659-664. In extruders of this type with a grooved feed section, the feed section determines the amount of polymer conveyed. The polymer pellets are compressed and conveyed in the feed section of extruders with a grooved feed section, and this results in high pressure. Melting of the pellets in the feed section is inhibited by cooling. However, a disadvantage with the usual method of operating a single-screw extruder with a grooved feed section when polyoxymethylene polymers are being processed to give blow moldings is that the moldings produced by the blow-molding process have poor mechanical properties, e.g. low tensile strain at break and reduced bursting pressure. Non-uniform wall thicknesses, and weld lines in the blow molding, can also occur.

BRIEF SUMMARY OF THE INVENTION

It is therefore an object of the present invention to provide a process for the production of moldings composed of polyoxymethylene polymers via blow molding that can produce moldings which have an improved mechanical property profile.

The object is achieved via a process for the production of moldings composed of a polyoxymethylene polymer via blow molding, comprising the following steps:

(a) extrusion of the polyoxymethylene polymer to give tubing, using an extruder with a grooved feed section, where the feed section is heated to a temperature in the range from 100 to 230° C., (b) introduction of the extruded tubing composed of the polyoxymethylene polymer into a blow mold, (c) production of the molding composed of the extruded tubing in the blow mold.

A DETAILED DESCRIPTION OF THE INVENTION

In contrast with the conventional processes currently used, the feed section is heated according to the process of the invention. The heating of the feed section has been shown to improve the mechanical properties of the molding produced by the blow molding process.

The polyoxymethylene polymer used for the process of the invention is preferably composed of:

A) from 99 to 99.99% by weight of at least one polyoxymethylene homo- or copolymer, B) from 0.01 to 1% by weight of a crosslinking agent.

The proportions by weight of the polyoxymethylene homo- or copolymer and of the crosslinking agent here are based in each case on the trioxane or formaldehyde used for the production of the polyoxymethylene homo- or copolymer.

An advantage of the polyoxymethylene polymer composed of at least one polyoxymethylene homo- or copolymer and from 0.01 to 1% by weight of a crosslinking agent is that its softening range is greater than that of known semicrystalline thermoplastics. The resultant improved use is also applicable to thermoforming processes. Semicrystalline thermoplastics can usually be subjected to forming processes only around or above the crystallite melting point. The suitable temperature range here is very narrow. If the temperature is too high, the semifinished products are converted to a free-flowing melt, but if the temperature is lowered only minimally the semifinished products are too stiff for the forming process. Current practice, therefore, is that semicrystalline thermoplastics are thermoformed only with constant monitoring, and opportunities for automation are considerably restricted and attended by high cost, because of the properties of the semicrystalline thermoplastics. These disadvantages are eliminated via the polyoxymethylene molding composition comprising the crosslinking agent. In particular, the polyoxymethylene molding composition exhibits a wider softening range than known semicrystalline thermoplastics. This can give greater processing latitude. It also permits automation of the molding process.

The softening range is the range within which the semifinished product deforms when a deformation pressure is applied, without forming a free-flowing melt.

Polyoxymethylene homo- or copolymers are known per se to the person skilled in the art and are described in the literature.

Very generally, these polymers comprise at least 50 mol % of —$CH_2O$— repeat units in the main polymer chain. Polyoxymethylene homopolymers are generally unbranched linear polymers which generally comprise at least 80%, preferably at least 90%, of oxymethylene units. The homopolymers are generally produced via polymerization of formaldehyde or of its cyclic oligomers, such as trioxane or tetroxane, preferably in the presence of suitable catalysts.

Homopolymers of formaldehyde or of trioxane are polymers whose hydroxyl end groups have been stabilized in a known manner to counter degradation, by a chemical method, for example esterification or etherification. Copolymers are polymers composed of formaldehyde or of its cyclic oligomers, in particular trioxane, and of cyclic ethers, of cyclic acetals, and/or of linear polyacetals.

For the purposes of the invention, polyoxymethylene copolymers are preferred as component A, particularly those which comprise not only the —$CH_2O$— repeat units but also up to 50 mol %, preferably from 0.1 to 20 mol %, in particular from 0.3 to 10 mol %, and very particularly preferably from 0.02 to 2.5 mol %, of repeat units,

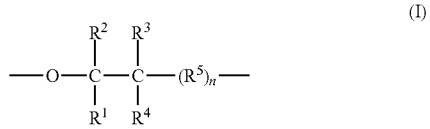

(I)

where $R^1$ to $R^4$, independently of one another, are a hydrogen atom, a $C_1$-$C_4$-alkyl group, or a halogen-substituted alkyl group having from 1 to 4 carbon atoms, and $R^5$ is a —$CH_2$—, $CH_2O$—, or a $C_1$-$C_4$-alkyl- or $C_1$-$C_4$-haloalkyl-substituted methylene group, or a corresponding oxymethylene group, and n has a value in the range from 0 to 3.

These groups can advantageously be introduced into the copolymers via ring-opening of cyclic ethers. Preferred cyclic ethers are those of the formula

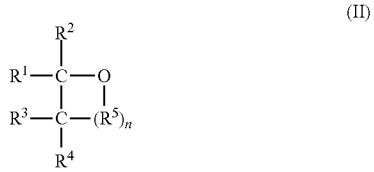

(II)

where $R^1$ to $R^5$, and n, are defined as above.

Merely by way of example, mention may be made of ethylene oxide, propylene 1,2-oxide, butylene 1,2-oxide, butylene 1,3-oxide, 1,3-dioxane, 1,3-dioxolane, and 1,3-dioxepan, as cyclic ethers, and also of linear oligo- or polyformals, such as polydioxolane or polydioxepan, as comonomers.

As crosslinking agent B for the process of the invention, by way of example, a bifunctional compound is used which comprises two higher cyclic ethers of the general formula (II), bonded to one another by way of the unit Z.

The polyoxymethylene polymer used for the process of the invention preferably comprises, as component B, a bifunctional compound of the formula

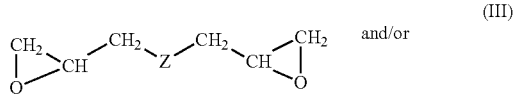

(III)

and/or

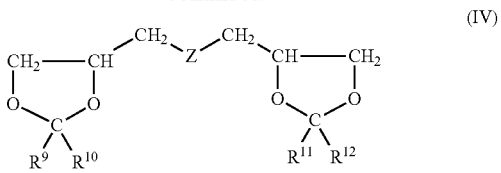

(IV)

where

Z is a chemical bond, —O—, —$OR^6O$—, —$R^7$—, —$R^7OR^8$—, —(O—$CH_2$—$CH_2$)$_n$—O—, or —(O—$CH_2$)$_n$—O—.

$R^6$ here is $C_1$-$C_8$-alkylene or $C_3$-$C_8$-cycloalkylene, each of $R^7$ and $R^8$, independently of the other, is a $C_1$-$C_{12}$-alkylene group, and n is a number from 1 to 4.

Z is preferably a chemical bond, —O—, or —$OR^6O$—, where $R^6$ is defined as above.

The link Z is preferably selected in such a way that it is stable with respect to the cationic reactive catalyst and initiators known for the polymerization of formaldehyde and of its cyclic oligomers, such trioxane and tetroxane, and this means that the link Z is not permitted to lead to any significant termination reactions, transfer reactions, or other reactions.

Each of the radicals $R^9$ to $R^{12}$ in the bifunctional compound of the formula (IV) is, independently of the others, hydrogen or a $C_1$-$C_4$-alkyl group. The radicals $R^9$ to $R^{12}$ are preferably hydrogen, and it is very particularly preferable that a bifunctional compound of the formula (IV) in which Z is oxygen and the radicals $R^9$ to $R^{12}$ are hydrogen is used as crosslinking agent B.

Preferred monomers of this type are ethylene diglycide, diglycidyl ether, and diethers composed of glycidyl compounds and formaldehyde, dioxane, or trioxane in a molar ratio of 2:1, and also diethers composed of 2 mol of glycidyl compound and 1 mol of an aliphatic diol having from 2 to 8 carbon atoms, examples being diglycidyl ethers of ethylene glycol, 1,4-butanediol, 1,3-butanediol, cyclobutane-1,3-diol, 1,2-propanediol, and cyclohexane-1,4-diol, to mention just a few examples.

Diglycerol diformal is particularly preferably used as component B. This can be produced relatively easily and with good yield from linear diglycerol and formaldehyde (in the form of aqueous solution, paraformaldehyde, or trioxane) in the presence of an acidic catalyst. The main product obtained is 4,4'-bis(1,3-dioxolanylmethyl) oxide. This has the general structure (IV), where Z is oxygen and the radicals $R^9$ to $R^{12}$ are hydrogen.

If diglycerol is used, being predominantly composed of the linear compound, but also comprising branched isomers alongside this, the reaction with formaldehyde leads to a mixture of isomers, such as glycerol diformals, the main constituent of which is the abovementioned compound. This mixture is just as suitable as the pure substance. The amounts usually used of the diglycerol diformal are from 0.01 to 1% by weight, preferably amounts in the range from 0.05 to 0.3% by weight, and in particular amounts in the range from 0.1 to 0.2% by weight, based on the weight of the trioxane used.

Processes for the production of the homo- and copolymers described above are known to the person skilled in the art and are described in the literature.

The preferred polyoxymethylene copolymers have melting points of at least 150° C. (DSC, ISO 3146) and molecular weights (weight-average) $M_w$, in the range from 5000 to 300 000, preferably from 7000 to 250 000 (GPC, PMMA standard).

Particular preference is given to end-group-stabilized polyoxymethylene polymers whose chain ends have C—C bonds.

The melt index (MVR value 190/2.16) of the polyoxymethylene polymers used is generally in the range from 0.5 to 50 cm³/10 min (ISO 1133).

Other suitable crosslinking agents B are erythritol diformal

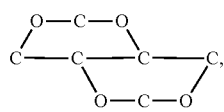

2,2-(trimethylene)bis(1,3-dioxolane)

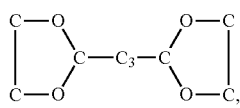

2,2-(phenylene)bis(1,3-dioxolane)

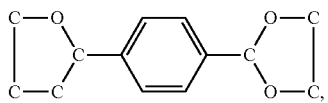

pentaerythritol diformal

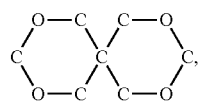

pentaerythritol diacetal

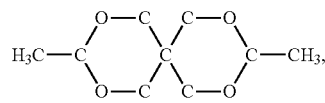

pentaerythritol dibenzal

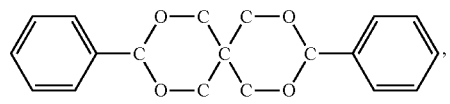

pentaerythritol dichloral

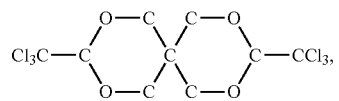

pentaerythritol dipropionaldehyde acetal

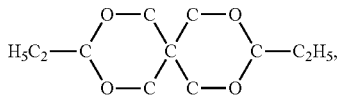

diformal of diethyl saccharate

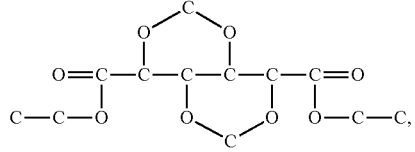

sorbitol triformal

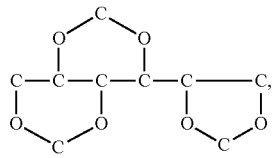

pentaerythritol diisovaleraldehyde acetal

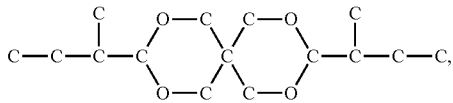

polyvinyl formal

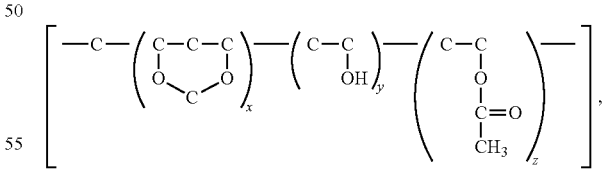

where x is preferably 9 or 10 times as great as y and z, pentaerythritol diacrolein acetal

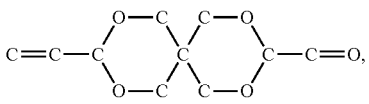

pentaerythritol diglyoxaldehyde acetal

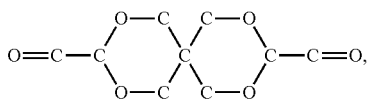

pentaerythritol di-p-nitrobenzaldehyde acetal

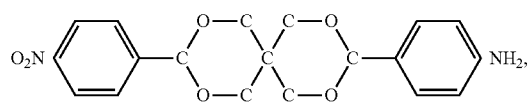

diisopropylidene aldehyde D-arabinose

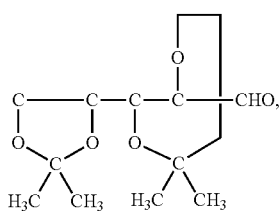 [SMILES: CC1(C)CCCOC(C=O)C(C2COC(C)(C)O2)O1]

dimethyleneiditol

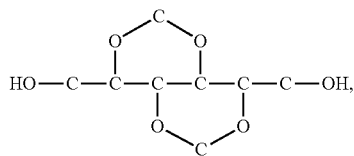 [SMILES: OCC1OCOC2C(CO)OCOC12]

1,2:3,4:5,6-triisopropylidenemannitol

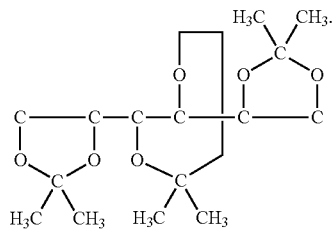 [SMILES: CC1(C)CCCOC(C2COC(C)(C)O2)C(C2COC(C)(C)O2)O1]

Other suitable materials comprising dioxacyclo rings comprise diacetals of a dialdehyde and of a polyhydric alcohol having the following structure:

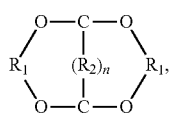

where $R^1$ derives from a polyhydric alcohol $R^1(OH)_2$ having from 1 to 8 carbon atoms.

Preference among these is given to the diacetal of malonaldehyde and ethylene glycol having the following structure:

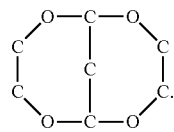

Other dialdehydes that can be used are, for example, oxaldehyde, succinaldehyde, glutaraldehyde, and others.

Examples of suitable polyhydric alcohols are glycerol, 1,2-propylene glycol, butylene 1,2-glycol, propylene 1,3-glycol, trimethylolpropane, sorbitol, and diethylene glycol.

The semifinished products for the production of moldings can moreover comprise up to 70% by weight, preferably up to 50% by weight, based on 100% by weight of components A and B, of other additives. Examples of suitable additives are
talc,
polyamides, in particular copolyamides,
alkaline earth metal silicates and alkaline earth metal glycerophosphates,
esters or amides of saturated aliphatic carboxylic acids,
ethers that derive from alcohols and from ethylene oxide,
nonpolar propylene waxes,
fillers, such as glass fibers, nanotubes, wollastonite, chalk, preferably with boric acid or with derivatives thereof, as synergists,
impact-modified polymers, in particular those based on ethylene-propylene (EPM) rubbers, on methyl methacrylate-butadiene-styrene (MBS) rubbers, or on ethylene-propylene-diene (EPDM) rubbers, or on thermoplastic polyurethanes,
flame retardants,
plasticizers,
coupling agents,
dyes and pigments,
formaldehyde scavengers, zeolites or polyethyleneimines, or melamine-formaldehyde condensates,
antioxidants, in particular those having phenolic structure, benzophenone derivatives, benzotriazole derivatives, acrylates, benzoates, oxanilines, and sterically hindered amines (HALS=hindered amine light stabilizers).

These additives are known and are described by way of example in Gächter/Müller, Plastics Additives Handbook, Hanser Verlag Munich, 4th edition 1993, Reprint 1996.

The amount of the additives depends on the additive used and on the desired action. The conventional amounts are known to the person skilled in the art. If concomitant use is made of the additives, they are added, for example individually or together, in the usual manner as a solution or suspension, or preferably in the form of masterbatch.

The finished polyoxymethylene molding composition for the production of the semifinished product can be produced in a single step, by, for example, mixing the polyoxymethylene and the additives in an extruder, kneader, mixer, or other suitable mixing apparatus, with melting of the polyoxymethylene, discharging the mixture, and then usually pelletizing the same. Further, it has proven advantageous to begin by premixing some or all of the components in a dry mixer or in another mixing apparatus, and to homogenize the resultant mixture in a second step, with melting of the polyoxymethylene, if appropriate with addition of further components, in an extruder or other mixing apparatus. In particular, it can be advantageous to premix at least the polyoxymethylene and the antioxidant (if used concomitantly).

The extruder or the mixing apparatus can have a devolatilizing apparatus, for example to provide a simple means of removing residual monomers or other volatile constituents. The homogenized mixture is discharged in the conventional manner, preferably pelletized.

The additives can be added under particularly mild conditions by minimizing the residence time between the discharge from the devolatilizing apparatus and entry into the mixing apparatus in which the additives are introduced. To this end, by way of example, the devolatilizing pot can be installed directly onto the extruder intake used for blending with the additives.

The resultant polyoxymethylene polymer is then processed via the process of the invention to give moldings via blow molding. To this end, the polyoxymethylene polymer is added, preferably in the form of pellets, to the extruder for the production of the tubing. It is very particularly preferable that the pellets are preheated to a temperature in the range from 60 to 150° C., more preferably in the range from 80 to 140° C., and in particular in the range from 100 to 130° C. The preheating can likewise improve the mechanical properties of the molding.

An example of equipment that can be used for the preheating of the pellets is suitable feed containers with heating elements. To this end, the walls can be, for example, of jacketed design, with a heating medium flowing through the jacket. However, an example of an alternative is provision of an electrical heating system. Examples of equipment suitable for this purpose are what are known as convection dryers or dehumidified-air dryers, which blow hot air into a container. In the case of dehumidified-air dryers, water is removed in advance from the air. Drying in a vacuum dryer is also conceivable. In order to obtain uniform preheating of the pellets, it is further preferable that the pellets are stirred in the feed container. This method can achieve improved heat transfer.

An example of another alternative is to use radiation to heat the pellets. By way of example, this method can use infrared radiation or microwave radiation to introduce energy, and therefore heat to the pellets, if appropriate also with stirring, until the appropriate temperature has been achieved.

The temperature of the blow mold used for the production of the molding is preferably in the range from 50 to 130° C., more preferably in the range from 60 to 115° C., and in particular in the range from 80 to 100° C. The temperature-control of the mold promotes good application of the mold cavity. If the mold temperature is too low, an effect is observed which is similar to defective deaeration of the mold. By way of example, mold-parting lines are clearly apparent on the component, and replication of the mold cavity is defective. An elevated mold temperature is also required for anticipation of any subsequent post-shrinkage of the molding. This method can, if appropriate, avoid any downstream annealing process, since the molding produced has to a very large extent achieved the final dimensions by this stage, and undergoes only a little post-shrinkage.

For production of the molding via blow molding, the mold is generally composed of two halves, and the tubing produced in the extruder is shaped by these, with formation of pinch-off welds, to give the molding. To this end, the two halves are brought together around the tubing, and a mandrel is inserted into the tubing. A suitable gas is injected into the tubing via the mandrel. The pressure with which the gas is injected is preferably in the range from 2 to 20 bar. The pressure presses the tubing against the mold, in such a way that the tubing replicates the negative form of the mold. Air is usually used as gas injected into the tubing. The gas injected into the tubing can also be temperature-controlled or can have admixed steam, in order to provide a high level of heat dissipation. Gases other than air can be used, examples being gases inert toward the polyoxymethylene polymer used. An example of another suitable gas is nitrogen.

In order to obtain a homogeneous melt, the length of the extruder is preferably in the range from 15 to 30·D. D is the diameter of the screw. An extruder suitable for the melting and extrusion of the tubing usually has not only the grooved feed section but also at least two further sections. The feed section is usually followed by a transition section, followed by a metering section. The extruder is heated in the region of the sections following the feed section. The screw can have constant flight depth and pitch, but another possible alternative is to use a screw in which the pitch changes or the flight depth changes, or a screw which has not only a conventional helical flight but also, for example, mixing sections or shearing components.

Examples of mixing sections usually used are those having perforations in the screw flight, or as an alternative there can also be studs provided in the screw channel, and in another possibility the mixing section has a channel which has perforations and whose direction is opposed to the usual thread direction of the channel, and in another possibility there are toothed disks formed on the screw or cams provided in the barrel and on the screw. It is also possible to use "pineapple" mixing sections or "Rapra" mixing sections.

Examples of shear components are shear torpedoes, Troester shear components, or Maddock shear components, or else a ring which is present on the screw and which produces a space.

Alongside the abovementioned sections, it is also possible, for example, to provide at least one devolatilizing section, in which the melt is devolatilized. Conventional devolatilization sections have a dome in the barrel above the screw, through which the gas is dissipated.

The person skilled in the art is aware of screw designs which are suitable and conventionally used in extruders.

In order to improve the melting behavior of the polyoxymethylene polymer, it is also possible, for example, to use barrier screws. These have a barrier flight which separates the melt from the solid which is still to be melted.

The length of the grooved feed section is preferably in the range from 3 to 6·D, and here again D is the diameter of the screw. For the purposes of the present invention, the diameter of the screw here is the external diameter of the screw. The length of the feed section is therefore sufficiently great that the pressure increase achieved in the polyoxymethylene polymer pellets added to the feed section is large enough to ensure uniform conveying of the polymer through the extruder. A feed section suitable for the process of the invention usually has from 4 to 8 grooves, running axially. However, an alternative possibility, for example, is to use helical grooves. If helical grooves are used, these can run either in the direction of rotation of the screw or else against the direction of rotation of the screw. However, preference is given to axially running grooves. During the course of the feed section, the depth of the grooves decreases and the grooves therefore taper toward the end of the feed section.

Grooves suitable for the process of the invention have, for example, a cross section in the shape of a rectangle, segment of a circle, or triangle. Preference is given to using grooves with a cross section in the shape of a rectangle.

According to the invention, the feed section is heated to a temperature in the range from 100 to 230° C. To this end, the feed section in the barrel generally has channels through which a heating medium can be passed. Examples of heating media are water, preferably pressurized, or hot oils. It is preferable that the feed section is heated by hot oils. Another possibility is that the feed section, and also the entire extruder, is heated using thermal elements by way of electrical heating tapes.

To avoid transfer of heat from the sections following the feed section to the barrel of the feed section, it is usual to provide a thermal separation system between the feed section and the following sections within the barrel of the extruder. This type of thermal separation system can by way of example be realized by using a disk composed of a material which has poor thermal conductivity and which resists the temperatures occurring in the extruder barrel. Suitable thermal separation systems are known to the person skilled in the art and are also used in modern conventional single-screw extruders with a grooved feed section. However, since according to the invention the feed section is heated, the thermal separation system here is not an essential requirement.

In order to melt the polyoxymethylene polymer, the sections following the feed section are heated to a temperature in the range from 180 to 230° C. The temperature here is preferably more than 30 K above the melting point of the polyoxymethylene polymer. The appropriate temperature causes first incipient melting and then melting of the polymer. A suitable screw geometry achieves homogenization of the melt. The sections following the feed section are by way of example likewise heated via heating channels which have been formed within the barrel and through which a heating medium is passed. The heating medium used can be the same as that used for the heating of the feed section. The barrel is usually divided into individual sections each heated by a separate heating circuit. This also permits heating of the individual sections to different temperatures. It is particularly preferred that the temperatures to which the sections following the feed section are heated decreases from the feed section toward the mold. The temperature difference from maximum to minimum temperature here is preferably in the range from 10 to 50 K, in particular in the range from 20 to 40 K, for example 30 K. The falling temperature here can by way of example be realized by heating each of the individual sections to different temperatures, with a falling temperature.

Alongside a heating system using a heating medium, another possible heating system for the extruder uses electrical heating elements. There can also be cooling apparatuses provided, for example in the form of blowers, for temperature control, for example in order to mitigate short-term temperature peaks. The manner of heating of the extruder is preferably such that the temperature of the melt at the die outlet is in the range from 180 to 230° C.

The polyoxymethylene polymer thus melted and homogenized is then extruded through a suitable extruder die at the end of the extruder, to give tubing. The tubing is introduced into the blow mold and is molded in the blow mold to give the molding.

Examples of moldings which can be produced by the process of the invention are containers, tanks, or storage vessels for media which are solids, pastes, liquids, or gases, or the moldings are pots, buckets, canisters, bottles, or hollow bodies in the general sense.

Examples of containers or storage vessels which can be produced via the process of the invention are containers and pressurized storage vessels for hydraulic oils and other fluids used in mechanical engineering, examples being fats, cooling water, fuels or other operating materials, containers or pressurized storage vessels for gases and gaseous fuel in particular in the form of in liners for tank systems, containers for chemicals intended to have minimum diffusion through the container wall, or else containers for foods, drinks, or animal feed which by way of example have to be protected from permeation generally and in particular from oxygen. Pots or buckets produced via the process of the invention can by way of example be used for the storage of goods. They can by way of example be sealed via lids or welded-on foils.

Examples of containers for food or drinks which are produced via the process of the invention are pots or in particular bottles.

The moldings produced via the process of the invention can be further processed via any desired further process. The components can thus by way of example be colored or printed.

Alongside the production of moldings composed of only one polymer, it is also possible by way of example to produce multilayer moldings. For this, by way of example, tubing is produced by the coextrusion process and is then subjected to a forming process in the blow mold to give the actual molding.

EXAMPLE

A hollow body is produced via a blow-molding process, from a polyoxymethylene copolymer composed of from 96.9 to 96.7% by weight of trioxane, about 3% by weight of butanediol formal, and from 0.1 to 0.3% by weight of diglycerol diformal. The polyoxymethylene copolymer is melted in an extruder with a grooved feed section, the feed section here being heated to a temperature of 220° C. The temperature of the polyoxymethylene copolymer pellets introduced is 110° C. The temperature profile set within the extruder falls from 220° to 190° C. toward the mold. Tubing is extruded from the polyoxymethylene copolymer, and is introduced into a blow mold. The temperature of the mold is controlled to 120° C. The hollow body is molded via injection of air at a pressure of 8 bar.

A second hollow body is manufactured from the same material, but here the feed section is cooled to 15° C. in accordance with familiar processes, the pellets are not pre-heated, and the mold is cooled to 20° C. In each case, a hollow body is formed, and tensile specimens are cut therefrom. Bursting pressure tests using internal water pressure are moreover carried out on further hollow bodies.

The tensile strain at break of the tensile specimens produced by the process of the invention, from the hollow bodies using heated material, heated feed section, and heated mold is in the range from 15 to 23%. The bursting pressure of these hollow bodies is determined as up to 30 bar. The tensile strain at break of the tensile specimens cut from the hollow body produced via the process using a cooled feed section is in the range from 6 to 11%. The bursting pressure determined is 25 bar. The process of the invention therefore permits the production of polyoxymethylene hollow bodies with significantly improved mechanical properties.

The invention claimed is:

1. A process for the production of a molding composed of a polyoxymethylene polymer via blow molding, comprising the following steps:
    (a) extruding the polyoxymethylene polymer to give extruded tubing, using an extruder with a grooved feed section, where the feed section is heated to a temperature in the range from 100 to 230° C., and where a thermal separation system is provided between the feed section and the following sections in the barrel of the extruder,
    (b) introducing the extruded tubing composed of the polyoxymethylene polymer into a blow mold,
    (c) producing the molding composed of the extruded tubing in the blow mold, wherein the polyoxymethylene polymer is in the form of pellets when added to the extruder, where the pellets are preheated to a temperature in the range from 60 to 150° C., wherein the polyoxymethylene polymer is composed of:

A) from 99 to 99.99% by weight of at least one polyoxymethylene homo- or copolymer, and B) from 0.01 to 1% by weight of a crosslinking agent.

2. The process according to claim 1, wherein the temperature of the blow mold is from 50 to 130° C.

3. The process according to claim 1, wherein the extruder comprises a screw and the length of the extruder is from 15 to 30·D, where D is the diameter of the screw.

4. The process according to claim 1, wherein the extruder has a grooved feed section and a screw, and wherein the length of the grooved feed section is from 3 to 6·D, where D is the diameter of the screw.

5. The process according to claim 1, wherein sections following the feed section are heated to a temperature in the range from 180 to 230° C.

6. The process according to claim 1, wherein the temperature of the melt at a die outlet is from 180 to 210° C.

7. The process according to claim 1, wherein the crosslinking agent B) is a bifunctional compound of the general formula

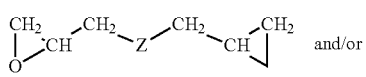 (III)

and/or

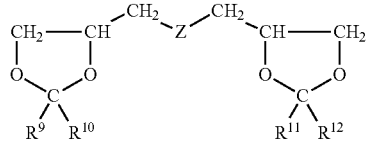 (IV)

where

Z is a chemical bond, —O—, —OR$^6$O—, —R$^7$—, —R$^7$OR$^8$—, —(O—CH$_2$—CH$_2$)$_n$—O—, or —(O—CH$_2$)$_n$—O—, R$^6$ is C$_1$-C$_8$-alkylene or C$_3$-C$_8$-cycloalkylene, each of R$^7$ and R$^8$, independently of the other, is a C$_1$-C$_{12}$-alkylene group, each of R$^9$ to R$^{12}$, independently of the others, is hydrogen or a C$_1$-C$_4$-alkyl group, and n is a number from 1 to 4.

8. The process according to claim 7, wherein Z is oxygen.

9. The process according to claim 7, wherein the crosslinking agent is a bifunctional compound of the general formula IV, where Z is oxygen and each of R$^9$ to R$^{12}$ is hydrogen.

10. The process according to claim 1, wherein the molding is a container, a tank, or storage vessel for media which are solids, liquids, pastes, or gases, or the molding is a pot, a bucket, a canister, a bottle, or a hollow body.

11. The process according to claim 1, wherein the temperatures to which the sections following the feed section are heated decreases from the feed section toward the mold.

12. The process according to claim 1, wherein the depth of the grooves of the feed section decreases and the grooves therefore taper toward the end of the feed section.

* * * * *